Apr. 17, 1923.
F. W. ERICKSON
1,452,268
COUPLING FOR PIPES, CONDUITS, ETC
Filed April 28, 1921
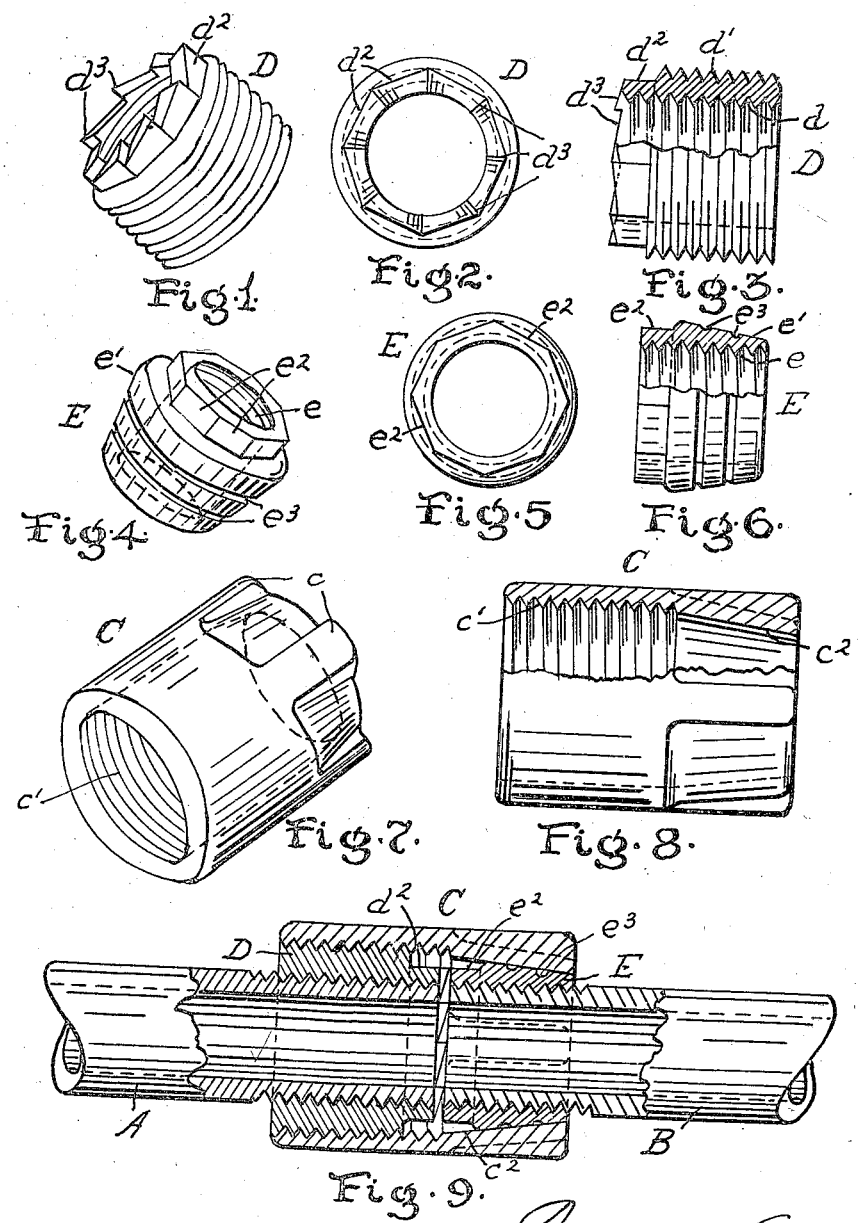

Patented Apr. 17, 1923.

1,452,268

UNITED STATES PATENT OFFICE.

FREDERIC W. ERICKSON, OF TARRYTOWN, NEW YORK.

COUPLING FOR PIPES, CONDUITS, ETC.

Application filed April 23, 1921. Serial No. 465,331.

*To all whom it may concern:*

Be it known that I, FREDERIC W. ERICKSON, a citizen of the United States, and resident of Tarrytown, in the county of Westchester and State of New York, have invented certain new and useful Improvements in Couplings for Pipes, Conduits, &c., of which the following is a specification.

The present invention relates to couplings for pipes, conduits and the like, the term pipe or pipes being hereinafter employed for the sake of brevity and not of limitation. The invention has particular reference to couplings for ordinary pipes the ends of which have no special formations such as lips or flanges, but are externally threaded at their ends.

One of the objects of the invention is to provide a coupling which is so compact in form that it can be used on pipes in locations where the space for manipulation is so limited that the ordinary pipe union or bolted flange union could not be employed.

Another object of the invention is to provide a simple and easily operated coupling which will provide a tight joint for pipes carrying gas, liquids, or electric wires.

With these and other objects in view, the invention consists in the improved coupling substantially as hereinafter described and claimed.

Of the accompanying drawings—

Figures 1, 2 and 3 are, respectively, a perspective view, an end view, and a side sectional view of one of the bushing members.

Figures 4, 5 and 6 are, respectively, a perspective view, an end view, and a side sectional view of the other bushing member.

Figures 7 and 8 are, respectively, a perspective view and a side sectional view of the outer sleeve member which couples the two bushing members together.

Figure 9 represents a longitudinal section of the entire coupling, including two pipe ends connected by the coupling.

Similar reference characters indicate the same parts in all of the views.

The pipe sections A and B are of ordinary form having straight cylindrical threaded ends, as indicated in Figure 9.

Referring to Figures 1, 2 and 3, in connection with Figure 9, the bushing member D is internally threaded at $d$ to fit the threaded end of one of the pipe sections, and is externally threaded at $d'$ for a portion of its length, the remaining portion being of less diameter and formed to be engaged by a wrench, such formation, in the present instance, consisting of a plurality of flat faces $d^2$. This end or edge of the bushing D is formed with serrations or ratchet teeth $d^3$, the purpose of which will be explained hereinafter.

The bushing member E (Figures 4, 5, 6 and 9) is internally threaded at $e$ to fit the threaded end of the other pipe section and is externally cone-shaped as at $e'$ and is formed with flat faces $e^2$, or otherwise suitably formed, to be engaged by a wrench. The conical portion of this bushing is formed with recesses or annular grooves $e^3$ to receive paste, pigment, or packing when the parts are assembled as hereinafter described. The bushing E is made of material relatively softer than that of both the bushing D and the sleeve C, and to this end it may be made of fiber, hard wood, spelter, or die cast metal.

The sleeve C (Figures 7, 8 and 9) is externally formed so it may be readily rotated, as by providing ribs $c$, and at one end is internally threaded as at $c'$ to fit the external threads of the bushing D. At the other end the sleeve is internally tapered as at $c^2$ to fit the cone end $e'$ of the bushing E.

When the parts are to be assembled as shown in Figure 9 the bushing D is fitted to the pipe A and the bushing E is fitted to the pipe B, the sleeve C having been previously placed on the pipe B away from or back of its end. Then, suitable packing material having been located in the recesses or grooves $e^3$ if deemed necessary, the sleeve is slid along to engage its internal threads $c'$ with the external threads $d$ of the bushing D and said sleeve is rotated to draw the two bushings and pipe sections together. During the last of this operation the internally tapered end of the relatively hard metal sleeve C not only seats closely upon the cone seat $e'$ of the softer bushing E and draws the adjacent ends of the bushings together, but also, owing to the relative softness of the material of the bushing E, tends to collapse or bind the latter upon the pipe end B. At the same time the serrations or teeth $d^3$ of the relatively hard bushing D to become so embedded in or interlocked with the end of the softer bushing E as to prevent undue backward rotation of one member relatively to the other.

A particular advantage of my improved coupling is that it enables the pipes to be used as parts of an electrical circuit. This is because relative rotations of the bushings, when assembling, causes the teeth $d^3$ to act somewhat as a tool in a lathe, due to the action of said teeth in turning down the end of the bushing E to bright unoxydized metal so as to ensure proper electrical contact. And then, the parts being firmly interlocked, permanency of the contact is maintained. It is to be understood, of course, that when the coupling is employed for electric installations as just described, the bushing E will be of metal suitable for the purpose.

Having now described my invention, I claim:—

1. A coupling to unite the threaded ends of pipes, comprising two internally threaded bushings on of which is formed with end teeth to bite into the end of the other, and a sleeve having an internal formation to engage said bushings and hold them in abutting relationship.

2. A coupling to unite the threaded ends of pipes, comprising two internally threaded bushings one of which is of harder material than the other and has end teeth to bite into the end of said other bushing, and a sleeve having an internal formation to engage said bushings and hold them in abutting relationship.

3. A coupling to unite the threaded ends of pipes, comprising two internally threaded bushings, one of said bushings being externally threaded and the other having a cone-shaped portion provided with packing recesses, and a sleeve internally threaded at one end and internally tapered at the other end.

4. A coupling for the purpose described, comprising two internally threaded bushings of relatively hard and soft material, the harder bushing having ratchet-shaped teeth at one end to engage the adjacent end of the softer bushing, and an enclosing sleeve having an internal formation to draw the bushings into tight endwise relationship.

5. A coupling for conduits employed as a part of an electrical circuit, said coupling including two relatively rotatable members one of which has projections capable of cutting into the other for the purpose of ensuring an electrical bond.

In testimony whereof I have affixed my signature.

FREDERIC W. ERICKSON.